United States Patent [19]

Gansinger

[11] 3,989,800

[45] Nov. 2, 1976

[54] ALKALI METAL GOLD CYANIDE METHOD

[75] Inventor: Grant N. Gansinger, Phoenix, Ariz.

[73] Assignee: Motorola, Inc., Chicago, Ill.

[22] Filed: Feb. 18, 1975

[21] Appl. No.: 550,694

Related U.S. Application Data

[63] Continuation-in-part of Ser. No. 427,747, Dec. 26, 1973, abandoned.

[52] U.S. Cl. .............................. 423/364; 204/43 G; 204/46 G; 423/371
[51] Int. Cl.² .......................................... C01C 3/11
[58] Field of Search .......... 423/364, 371; 204/43 G, 204/46 G

[56] References Cited
UNITED STATES PATENTS 3,112,174  11/1963  Freedman........................... 423/364

OTHER PUBLICATIONS

Sneed et al., "Comprehensive Inorganic Chemistry", vol. 2, Copper, Silver & Gold, D. Van Nostrand Co., Inc. New York, 1954, pp. 195–197, 230, 232.

*Primary Examiner*—Earl C. Thomas
*Attorney, Agent, or Firm*—Harry M. Weiss; Lowell E. Clark

[57] ABSTRACT

This disclosure relates to a method for preparing alkali metal gold cyanide which has been found to be particularly useful in gold electroplating operations in the semiconductor industry in order to provide electrical contacts to semiconductor devices. In the process, finely divided gold metal particles are reacted with hydrogen peroxide and alkali metal cyanide to produce univalent alkali metal gold cyanide. The alkali metal gold cyanide is then acidified with a mineral acid in order to precipitate out gold cyanide. The gold cyanide is subsequently removed by filtration, washed and redissolved in a solution of alkali metal cyanide thereby yielding the final alkali metal gold cyanide end product in its pure state.

5 Claims, No Drawings

ALKALI METAL GOLD CYANIDE METHOD

This is a continuation-in-part of copending application Ser. No. 427,747 filed Dec. 26, 1973 and now abandoned.

BACKGROUND OF THE INVENTION

1. Field of the Invention

This invention relates generally to a method for producing alkali metal gold cyanide and, more particularly, to a method for producing alkali metal gold cyanide starting from a mixture of finely divided gold metal particles, hydrogen peroxide, and alkali metal cyanide.

2. Background of the Prior Art

Potassium gold cyanide has become a very popular chemical compound in the semiconductor industry for use in electroplating gold to be used as contacts on semiconductor devices. As a result of this great importance of the potassium gold cyanide material, it soon became very evident that improved processing techniques were needed to handle the gold deposited material that was not utilized in the fabrication of the gold contacts for the semiconductor devices. In carrying out the electroplating process for depositing gold onto the semiconductor devices, it often occurred that various other parts were coated with gold as it was difficult, if not impossible, to selectively control the electroplating process to only deposit gold onto the desired portions of the semiconductor devices. The natural result of this additional or excess electroplating was that gold often was deposited onto objects such as holders for the semiconductor products or other similar objects that were an integral part of the electroplating process. This was recognized by the workers skilled in the electroplating arts and various techniques were tried to develop methods for salvaging the gold deposited on undesired substrates.

Many attempts at recycling the excess gold deposited onto undesired substrates utilized electrolysis which is an inherently slow process that moreover requires the preprocessing of gold into anodes before being incorporated into electrolytic potassium gold cyanide producing cells. In order to obtain cyanide-free product, fractional crystallization was then employed as the purification process. Due to the physical properties of both cyanide and potassium gold chloride, fractional crystallization is an inefficient and therefor costly method to separate the two substances. Although the resultant final product derived from the fractional crystallization process is substantially cyanide-free, its purity, mainly with respect to silver contamination of the starting material is relatively high and is not completely removed by the fractional crystallization process. The reason for this is that the potassium gold cyanide does not undergo any purification in the fractional crystallization process and, thus, this prior art method was generally found to be unsatisfactory for the more sophisticated semiconductor manufacturer's use of high purity potassium gold cyanide materials.

Various attempts have been made to chemically produce potassium gold cyanide; however, the people skilled in the art generally considered this approach to be much more complex than the electrolysis method described above. For example, U.S. Pat. No. 3,112,174 teaches that the preparation of this compound from gold powder and potassium cyanide in the presence of an oxidizing agent such as air or a peroxide is slow and difficult to control on a small scale. Additionally, the price or cost per ounce together with the pre-refining charges to convert gold to potassium gold cyanide using the prior art techniques was extremely high.

As a result, a need existed to find a method for overcoming all of the above disadvantages associated with the prior art methods for producing potassium gold cyanide. Additionally, the new method would have to produce potassium gold cyanide without the previous preprocessing step of producing the gold into a foil, but would utilize finely divided gold metal particles in the form of gold sand which is the usual final product of a gold reclaiming and refining process that exists in semiconductor manufacturing gold salvage operations.

SUMMARY OF THE INVENTION

It is an object of this invention to provide an improved method for producing alkali metal gold cyanide.

It is another object of this invention to provide an improved method for producing alkali metal gold cyanide by chemical means.

It is a still further object of this invention to produce pure alkali metal gold cyanide starting with finely divided gold metal particles.

Now it has been found in accordance with this invention that pure alkali metal gold cyanide can be readily provided by a process which comprises reacting finely divided gold particles with hydrogen peroxide and alkali metal cyanide to provide a reaction mixture containing alkali metal gold cyanide and soluble inorganic by-products; acidifying the reaction mixture with a mineral acid to provide insoluble gold cyanide; removing said insoluble gold cyanide from the reaction mixture; and reacting said insoluble gold cyanide with alkali metal cyanide to produce alkali metal gold cyanide.

DESCRIPTION OF THE INVENTION

More in detail, the process of this invention proceeds in accordance with the following general equations wherein M is an alkali metal, e.g., sodium, potassium, etc., HA is a mineral acid and A is the anion of a mineral acid:

I

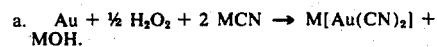

a. $Au + \frac{1}{2} H_2O_2 + 2\ MCN \rightarrow M[Au(CN)_2] + MOH.$

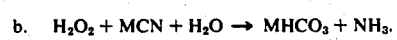

b. $H_2O_2 + MCN + H_2O \rightarrow MHCO_3 + NH_3.$

II

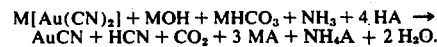

$M[Au(CN)_2] + MOH + MHCO_3 + NH_3 + 4\ HA \rightarrow AuCN + HCN + CO_2 + 3\ MA + NH_4A + 2\ H_2O.$

III

$AuCN + MCN \rightarrow M[Au(CN)_2].$

The first step of the process comprises reacting finely divided gold particles with aqueous hydrogen peroxide and alkali metal cyanide in a trimolecular reaction to provide the corresponding alkali metal gold cyanide and alkali metal hydroxide. Generally 30% by weight aqueous hydrogen peroxide is employed, but the concentration is not critical. While the gold reacts with the hydrogen peroxide in accordance with equation I (a) to provide the alkali metal gold cyanide, a competing side reaction illustrated by equation I (b) also occurs. Accordingly, stoichiometric excesses of hydrogen peroxide and alkali metal cyanide are generally preferred in order to compensate for the loss of these reactants via the bimolecular reaction of hydrogen peroxide with alkali metal cyanide. In order to control the reaction and optimize yields, the finely divided gold particles are dissolved in alkali metal cyanide solution into which hydrogen peroxide is added slowly and continuously. While the reaction proceeds over a wide temperature range, temperatures from about 55° to about 65° C are preferred. The products obtained in this first step are soluble in water, and thus further reaction is necessary in order to recover the desired alkali metal gold cyanide.

In the next step, the reaction solution is treated with an appropriate mineral acid to a pH of between about 0.5 to about 1.0 in order to provide insoluble gold cyanide in accordance with equation II. Acids such as hydrochloric acid or sulfuric acid can be employed. The concentration of the acid is not critical since it is added until the desired pH is reached. The by-products of this reaction are hydrogen cyanide, carbon dioxide and the alklai metal and ammonium salts of the mineral acid, for example, potassium sulfate, potassium chloride, ammonium chloride, etc.

The insoluble gold cyanide is then removed from the reaction mixture by any suitable means such as filtration, dissolved in aqueous alkali metal cyanide and reacted therewith in accordance with equation III to provide the desired alkali metal gold cyanide. The reaction proceeds at room temperature, put preferably elevated temperatures up to 100° C are employed. The alkali metal gold cyanide can be used directly or separated from the reaction mixture by conventional means. Furthermore, it is obtained in high yields, that is 95% or higher, and excellent purity.

While the reaction has been described with respect to alkali metal gold cyanide, it is preferred to prepare potassium gold cyanide, which has particular utility in the semiconductor industry as previously discussed.

The following example in which all parts are by weight will serve to illustrate the practice of this invention:

EXAMPLE

A suspension of 1 part gold particles in a solution of 1.8 parts potassium cyanide and 12 parts water was prepared. The suspension was heated to 58° – 61° C and vigorously agitated, and 1.4 parts of 30% hydrogen peroxide was added continuously over a 6 hour period while maintaining the temperature of the reaction mixture within the above limits. After the particles of gold were dissolved in this solution, the pH was lowered to 0.5 with hydrochloric acid, thereby liberating prussic acid and a small amount of carbon dioxide and forming insoluble yellow gold cyanide precipitate. When the liberation of prussic acid ceased, the precipitated gold cyanide was removed from the mixture by filtration and washed free of chloride with 0.1% sulphuric acid. One part of the gold cyanide precipitate was then dissolved at 85° C in an aqueous solution containing 0.3 parts of potassium cyanide forming potassium gold cyanide; the potassium gold cyanide was then recovered by fractional crystallization.

What is claimed is:

1. A method for converting finely divided gold particles into an aqueous electroplating solution of pure alkali metal gold cyanide which comprises:
   reacting said gold particles with hydrogen peroxide and alkali metal cyanide to provide a reaction mixture comprising alkali metal gold cyanide and soluble inorganic by-products;
   acidifying said reaction mixture with a mineral acid to provide insoluble gold cyanide;
   removing said soluble gold cyanide from the reaction mixture; and
   reacting said insoluble gold cyanide with alkali metal cyanide to produce alkali metal gold cyanide.

2. The method of claim 1 wherein potassium gold cyanide is provided by employing potassium cyanide as the alkali metal cyanide.

3. The method of claim 2 wherein said reaction of gold particles with hydrogen peroxide and alkali metal cyanide is carried out at a temperature between about 55° and about 65° C.

4. The method of claim 3 wherein sulfuric acid is employed as the mineral acid.

5. The method of claim 1 wherein said gold particles are reacted with stoichiometric excesses of hydrogen peroxide and alkali metal cyanide to provide the reaction mixture comprising alkali metal gold cyanide and soluble inorganic by-products.

* * * * *